(12) United States Patent
Smith et al.

(10) Patent No.: US 10,315,148 B2
(45) Date of Patent: Jun. 11, 2019

(54) FLUIDIC FILTER

(71) Applicant: ESA European Space Agency, Paris (FR)

(72) Inventors: Matthew Smith, Noordwijk (NL); Christopher Hunter, Noordwijk (NL); Don De Wilde, Noordwijk (NL); Nick Goody, Noordwijk (NL)

(73) Assignee: ESA European Space Agency, Paris (FR)

( * ) Notice: Subject to any disclaimer, the term of this patent is extended or adjusted under 35 U.S.C. 154(b) by 33 days.

(21) Appl. No.: 15/523,916

(22) PCT Filed: Nov. 3, 2014

(86) PCT No.: PCT/EP2014/073611
§ 371 (c)(1),
(2) Date: May 2, 2017

(87) PCT Pub. No.: WO2016/070904
PCT Pub. Date: May 12, 2016

(65) Prior Publication Data
US 2017/0341003 A1    Nov. 30, 2017

(51) Int. Cl.
*B01D 46/24*    (2006.01)
*B01D 46/52*    (2006.01)
(Continued)

(52) U.S. Cl.
CPC ............ *B01D 46/24* (2013.01); *B01D 29/21* (2013.01); *B01D 35/02* (2013.01);
(Continued)

(58) Field of Classification Search
CPC .... B01D 46/24; B01D 46/52; B01D 46/2403; B01D 46/521; B01D 46/0012;
(Continued)

(56) References Cited

U.S. PATENT DOCUMENTS 3,458,050 A    7/1969    Cooper
4,699,715 A    10/1987    Lee, II
(Continued)

OTHER PUBLICATIONS

International Search Report for PCT/EP2014/073611, dated Aug. 5, 2015, 9 pages.

*Primary Examiner* — Madeline Gonzalez
(74) *Attorney, Agent, or Firm* — Seed Intellectual Property Law Group LLP (57) ABSTRACT

A fluidic filter for filtering a fluid includes a filter housing having an inlet part, an outlet part and a housing part, and a filter element having an inlet side and an outlet side. The filter element is housed inside the housing part of the filter housing and includes a first flow passage that extends along a longitudinal direction of the filter element and is connected to the outlet part, and a plurality of ridges extending along the longitudinal direction. A plurality of second flow passages respectively are formed between ridges and an inner surface of the housing part, allowing the fluid to flow from the inlet side of the filter element along the longitudinal direction. At least a portion of the plurality of ridges facing the second flow passages is permeable to the fluid so as to allow passage of the fluid from the second flow passages to the first flow passage. A tip portion of each of the plurality of ridges is joined to the inner surface of the housing part along a part of the tip portion of the respective ridge in the longitudinal direction.

19 Claims, 6 Drawing Sheets

(51) Int. Cl.
*B01D 29/21* (2006.01)
*B01D 35/02* (2006.01)
*B01D 46/00* (2006.01)

(52) U.S. Cl.
CPC ..... *B01D 46/0012* (2013.01); *B01D 46/2403* (2013.01); *B01D 46/52* (2013.01); *B01D 46/521* (2013.01); *B01D 2201/0415* (2013.01); *B01D 2201/184* (2013.01)

(58) Field of Classification Search
CPC .. B01D 35/02; B01D 29/21; B01D 2201/184; B01D 2201/0415
USPC ..................................... 210/446, 490, 493.1
See application file for complete search history.

(56) References Cited

U.S. PATENT DOCUMENTS 5,320,657 A     6/1994   Adams
5,657,750 A * 8/1997   Colman ............... B01D 46/002
                                                            128/204.13

* cited by examiner

FLUIDIC FILTER

BACKGROUND

Technical Field

The present disclosure relates to a filter for filtering a fluid, i.e., a fluidic filter. The disclosure is particularly, though not exclusively, applicable to filters for space propulsion.

Description of the Related Art

A type of fluidic filter known in the art is a so-called etched disk filter. The design of such filters is based on a filter element that consists of a stack of disk rings. The disk surfaces are etched (e.g., photo-chemically etched) to thereby generate fluid passages between adjacent disks that allow a fluid to flow from the outside of the stack of disk rings to the inside. Etched disk filters are known to provide a comparatively large filter area and provide comparatively fine filtration rates, wherein the filtration rate is understood to indicate the size of the largest contaminants that may still pass through the filter. However, such filters have a number of disadvantages. Since typically for each of the disk rings more material is retained than is removed by the etching, the etched disk filter has a comparatively large mass. Moreover, the use of multiple components, such as the plural disk rings and the attachment mechanism for these rings and the filter housing into which the stack of disk rings is inserted, potentially allow for dislocation of components. As a consequence, this may result in wear of components. Another problem resulting from the use of multiple components is a mismatch of coefficients of thermal expansion (CTE mismatch). Since the several components need to be joined by welding, plural manufacturing steps are necessary, which increases time and cost for manufacturing.

Wire mesh filters are another type of filters that are known in the art. In wire mesh filters, a filter element is formed from a wire mesh comprising a plurality of interwoven strands (also referred to as threads or wires) that allows a fluid to flow from the outside of the filter element to the inside. Such filters have the problem that the filter rating (filtration rate) may degrade during the lifetime of the filter due to a spread of the filter passages resulting from strand movement. In fact, filter passages in wire mesh filters may open up by a factor of about two during the filter lifetime. A further problem may be present in the fixing of the wire mesh to the further components of the filter, such as the filter housing. In particular, the problem may occur that strands of the wire mesh become loose during the lifetime of the filter, which also results in a degradation of the filter rating. Compared to etched disk filters, the surface area of a wire mesh filter of comparable size is typically smaller, and accordingly the pressure drop in the fluid resulting from the filtering operation typically exceeds that of a comparable etched disk filter.

Thus, what is needed is a fluidic filter that, at the same time, offers a filter rating acceptable for space propulsion, that has a comparably large filter surface area and comparably small pressure drop, that is light, that has a stable filter rating over time, and that is easier to manufacture than state of the art fluidic filters.

BRIEF SUMMARY

In at least one aspect, the present disclosure provides a fluidic filter with a reduced mass. In another aspect, the disclosure provides a fluidic filter that may be manufactured at reduced cost. In yet another aspect, the disclosure provides a fluidic filter that is resistant to wear of components and dislocation of components. Yet another aspect of the disclosure is to provide a fluidic filter that is not affected by mismatch of coefficients of thermal expansion (CTE mismatch). In yet another aspect, the disclosure provides a fluidic filter that has a reduced pressure drop. In yet another aspect, provided herein is a fluidic filter that has a stable filter rating over time.

According to at least one embodiment, a fluidic filter for filtering a fluid comprises a filter housing having an inlet part, an outlet part and a housing part, and a filter element having an inlet side and an outlet side. The filter element is housed inside the housing part of the filter housing, wherein the filter element comprises: a first flow passage inside the filter element that extends along a longitudinal direction of the filter element and is connected to the outlet part, and a plurality of ridges extending along the longitudinal direction. A plurality of second flow passages respectively are formed between ridges and an inner surface of the housing part, allowing the fluid to flow from the inlet side of the filter element along the longitudinal direction. At least a portion of the plurality of ridges facing the second flow passages is permeable to the fluid so as to allow passage of the fluid from the second flow passages to the first flow passage. A tip portion of each of the plurality of ridges is joined to the inner surface of the housing part along a part of the tip portion of the respective ridge in the longitudinal direction. For each of the plurality of ridges, the length of said part of the tip portion may be more than half of the length of the tip portion of the respective ridge. Preferably, a depth of the second flow passages in a protruding direction of the respective ridges is between 0.2 and 0.4 of a diameter of the filter element, i.e., between 0.2 to 0.4 of an inner diameter of the housing part (if the housing part does not have a circular cross-section, the diameter at the respective azimuthal position of the second flow passage is understood here). Put differently, the depth of the second flow passages in the protruding direction of the respective ridges is between 0.4 and 0.8 of a distance, in the protruding direction, from the center line of the filter element to the tip portion of a ridge adjacent to the respective second flow passage.

The fluidic filter according to the above configuration has a plurality of ridges (lobes) that extend in the longitudinal direction of the filter element, wherein a plurality of second flow passages, respectively, are formed between ridges and an inner surface of the housing part. In other words, the fluidic filter has a multi-lobe cross section. Accordingly, the fluid may flow along the longitudinal direction of the filter element in the plurality of second flow passages and may pass from the second flow passages to the first flow passage, that is from the outside of the filter element to the inside of the filter element, at a plurality of positions both along the longitudinal direction and along a protruding direction of the ridges, wherein the protruding direction extends transversely, in particular perpendicularly, to the longitudinal direction. In other words, provision of the plurality of ridges between which the second flow passages are respectively formed results in a significant increase of filter surface per unit volume of the filter element compared to prior art filters having an elongated, in particular cylindrical, filter element, such as typical etched disk filters. Accordingly, a very compact fluidic filter with a significantly increased filter surface, and therefore significantly improved pressure drop is provided that is also less prone to clogging. In addition, the ratio of filter mass per unit filter surface may be reduced.

A particular advantage is achieved if a tip portion of each of the plurality of ridges is joined to the inner surface of the housing part substantially along a full length of the respective ridge (i.e., of the respective tip portion) in the longitudinal direction.

By joining the tip portion of each of the plurality of ridges to the inner surface of the housing part, dislocation of the filter element or parts of the filter element during the lifetime of the fluidic filter is prevented. Accordingly, mechanical wear of the fluidic filter during its lifetime is reduced, and also a degradation of the filter rating due to e.g., warping or bending of the filter element is effectively prevented.

Preferably, said portion of the plurality of ridges comprises a mesh of interconnected elongated elements (elongated mesh-forming elements, e.g., struts, strands, threads, or wires). Further preferably, the elongated elements of the mesh are joined to each other at their respective points of contact. Further preferably, said portion of the plurality of ridges comprises a plurality of parallel layers of mesh of interconnected elongated elements, i.e., a plurality of parallel layers that are stacked on top of each other. Further preferably, adjacent layers of mesh are displaced with respect to each other in a direction extending in (i.e., being parallel to) a plane of the plurality of parallel layers of mesh. Yet further preferably, adjacent layers of mesh are joined by elongated elements extending in a direction intersecting the layers (i.e., in a direction not being parallel to the plane of the plurality of layers), or alternatively, elongated elements of adjacent layers of mesh are joined to each other at respective points of contact of the elongated elements of the adjacent layers.

Providing the plurality of ridges formed from a mesh (mesh of interconnected elongated elements, or lattice) allows ensuring passage of the fluid from the outside of the filter element to its inside in a comparatively simple and cost-effective manner. A desired filter rating smaller than the spacing between adjacent struts (exemplarily embodying elongated elements) within a single layer of mesh can be obtained by providing a plurality of layers of mesh that are arranged in parallel, that is with the respective planes in which the struts of each layer of mesh extend arranged in parallel, and displaced (shifted) with respect to each other in a direction that extends in parallel to the planes of the layers of mesh. In other words, providing plural layers of mesh that are displaced with respect to each other results in a reduced filter passage size and further prevents long slender contaminants from passing. Since the struts within each layer of mesh are joined to each other at their respective points of contact, a widening of the fluid passage by movement of struts during the lifetime of the fluidic filter is prevented, and a degradation of the filter rating does not occur. The same effect is achieved by joining adjacent layers by struts (inter-layer struts) extending in the direction intersecting the layers, or alternatively by joining respective struts of adjacent layers of mesh to each other at respective points of contact. Since further the tip portions of the ridges are joined to the inner surface of the housing part, a stable overall configuration of the fluidic filter is achieved. The inter-layers struts additionally contribute to reducing travel of contaminants in the space formed between adjacent layers.

In one embodiment, the filter element, at the inlet side thereof, comprises an inlet side end portion shaped for diverting the flow of the fluid flowing from the inlet part to the plurality of second flow passages. Preferably, the plurality of ridges and the plurality of second flow passages extend into the inlet side end portion of the filter element. Further preferably, a surface of the inlet side end portion that faces the inlet part of the filter housing is configured to be not permeable to the fluid. Yet further preferably, a wall portion of the inlet side end portion has an angle of inclination between 45 degrees and 60 degrees (inclusive) with respect to a plane extending in perpendicular to the longitudinal direction of the filter element, i.e., an angle of inclination between 30 and 45 degrees (inclusive) with respect to the longitudinal direction. In other words, the inlet side end portion corresponds to a fluted cone tip of the filter element.

Providing the inlet side end portion (tip portion), the fluid flowing from the inlet part of the filter housing is diverted to the plurality of second flow passages, which ensures a smooth flow of the fluid within the filter housing and prevents particle build-up at the head of the filter element as well as clogging. Since the plurality of ridges and second flow passages extend into the inlet side end portion, the fluid may smoothly enter the plurality of second flow passages. Excellent diversion of the fluid is achieved if the inlet side end portion itself is not permeable to the fluid. Also, it has been shown that a cone-like shape of the inlet side end portion with an inclination of the lateral surface with respect to the longitudinal axis of 30° or more and 45° or less allows to achieve very good diversion of the fluid and, at the same time, easy manufacturing of the fluidic filter, for instance by additive manufacturing.

In a preferred embodiment, the filter housing and the filter element are formed monolithically (i.e., as a unit). Preferably, the filter housing and the filter element are formed from a corrosion-resistant metal. Alternatively, the filter housing and the filter element may be formed form ceramics or plastics. Further preferably, the filter housing and the filter element are formed from a titanium alloy. Yet further preferably, the filter housing and the filter element are formed in a layer-wise manner by additive manufacturing.

According to the above configuration, the filter housing and the filter element (including the mesh of interconnected elongated elements) are formed monolithically, i.e., they are formed as a unit. This may be achieved in a simple and cost-effective manner by additive manufacturing. An overview over state of the art techniques for additive manufacturing is provided in Wohlers Report 2013—Additive Manufacturing and 3D Printing State of the Industry Annual Worldwide Progress Report, Wohlers Associates Inc., 2013. The fluidic filter according to the present aspect of the disclosure is particularly designed so as to enable being formed by additive manufacturing, for instance by the choice of the angle of inclination of the lateral surface of the inlet side end portion. If the filter is formed from a corrosion-resistant metal such as a titanium alloy, durability of the fluidic filter is increased. Moreover, forming the filter element and the filter housing monolithically, for instance by additive manufacturing, allows joining the tip portions of the ridges to the inner surface of the housing part, and the joining of respective struts within or between layers of mesh already at the time of formation. Accordingly, no subsequent processing such as welding is required and stable joints between the respective afore-mentioned elements are achieved. Therefore, dislocation of components during the lifetime of the fluidic filter is effectively prevented. Since the fluidic filter is formed monolithically, also problems related to a mismatch of coefficients of thermal expansion of components of the fluidic filter do not occur—all components of the fluidic filter are formed from the same material—and the durability of the fluidic filter is further improved. In consequence, a fluidic filter according to this embodiment is particularly rigid and resilient against mechanical deformation so that its initial geometry is maintained at all times during normal operation.

According to another aspect of the disclosure, a section of pipe for allowing flow of a fluid comprises an inlet part, an outlet part, an intermediate part, wherein the intermediate part has a larger diameter than each of the inlet part and the outlet part and forms a leak-tight unit with the inlet part and the outlet part, and a filter element comprising a mesh part having a plurality of interconnected elongated elements (elongated mesh-forming elements, e.g., struts, strands, threads, or wires). The filter element is arranged inside the intermediate part, wherein the inlet part, the outlet part, the intermediate part and the filter element are formed as a unit by additive manufacturing.

As the present inventors have found out, a leak-tight unit enclosing a mesh part can be formed in a single processing step by additive manufacturing. Such a leak-tight unit (section of pipe) may relate to a fluidic filter. Forming the leak-tight unit by additive manufacturing dispenses the need for further manufacturing steps such as forming a housing part with an opening, inserting a mesh part through the opening, and closing the opening by another housing part so that in particular no further joining, e.g., welding, of components of the leak-tight unit is required. Accordingly, problems relating to dislocation of components during the lifetime of the leak-tight unit and mismatch of coefficients of thermal expansion do not occur.

In the above, the filter element has an inlet side and an outlet side, and preferably comprises a first flow passage inside the filter element that extends along a longitudinal direction of the filter element and is connected to the outlet part, and a plurality of ridges extending along the longitudinal direction. A plurality of second flow passages respectively are formed between ridges and an inner surface of the intermediate part, allowing the fluid to flow from the inlet side of the filter element along the longitudinal direction. The mesh portion of the filter element is arranged at the plurality of ridges facing the second flow passages and is permeable to the fluid so as to allow passage of the fluid from the second flow passages to the first flow passage.

Preferably, a depth of the second flow passages in a protruding direction of the respective ridges is between 0.2 and 0.4 of a diameter of the filter element, i.e., between 0.2 to 0.4 of an inner diameter of the housing part (if the housing part does not have a circular cross-section, the diameter at the respective azimuthal position of the second flow passage is understood here). Put differently, the depth of the second flow passages in the protruding direction of the respective ridges is between 0.4 and 0.8 of a distance, in the protruding direction, from the center line of the filter element to the tip portion of a ridge adjacent to the respective second flow passage.

A particular advantage is achieved if a tip portion of each of the plurality of ridges is joined to the inner surface of the intermediate part along a full length of the respective ridge (i.e., the respective tip portion) in the longitudinal direction.

Preferably, said mesh portion comprises a mesh of interconnected elongated elements (elongated mesh-forming elements, e.g., struts, strands, threads, or wires). Further preferably, the elongated elements of the mesh are joined to each other at their respective points of contact. Further preferably, said portion of the plurality of ridges comprises a plurality of parallel layers of mesh of interconnected elongated elements, i.e., a plurality of parallel layers that are stacked on top of each other. Further preferably, adjacent layers of mesh are displaced with respect to each other in a direction extending in (i.e., being parallel to) a plane of the plurality of parallel layers of mesh. Yet further preferably, adjacent layers of mesh are joined by elongated elements extending in a direction intersecting the layers (i.e., in a direction not being parallel to the plane of the plurality of layers), or alternatively elongated elements of adjacent layers of mesh are joined to each other at respective points of contact of the elongated elements of the adjacent layers.

In one embodiment, the filter element, at the inlet side thereof, comprises an inlet side end portion shaped for diverting the flow of the fluid flowing from the inlet part to the plurality of second flow passages. Preferably, the plurality of ridges and the plurality of second flow passages extend into the inlet side end portion of the filter element. Further preferably, a surface of the inlet side end portion that faces the inlet part of the section of pipe is configured to be not permeable to the fluid. Yet further preferably, a wall portion of the inlet side end portion has an angle of inclination of 45 degrees or more and 60 degrees or less with respect to a plane extending in perpendicular to the longitudinal direction of the filter element.

In a preferred embodiment, the inlet part, the outlet part, the intermediate part, and the filter element are formed monolithically. Preferably, the inlet part, the outlet part, the intermediate part, and the filter element are formed from a corrosion-resistant metal. Alternatively, the inlet part, the outlet part, the intermediate part, and the filter element may be formed from ceramics or plastics. Further preferably, the inlet part, the outlet part, the intermediate part, and the filter element are formed from a titanium alloy. Yet further preferably, the inlet part, the outlet part, the intermediate part, and the filter element are formed in a layer-wise manner by additive manufacturing.

BRIEF DESCRIPTION OF THE DRAWINGS

The disclosure is explained below in an exemplary manner with reference to the accompanying drawings, wherein.

DETAILED DESCRIPTION

Preferred embodiments of the present disclosure will be described in the following with reference to the accompanying figures, wherein in the figures identical objects are indicated by identical reference numbers. It is understood that the present disclosure shall not be limited to the described embodiments, and that the described features and aspects of the embodiments may be modified or combined to form further embodiments of the present disclosure.

Figure 1:
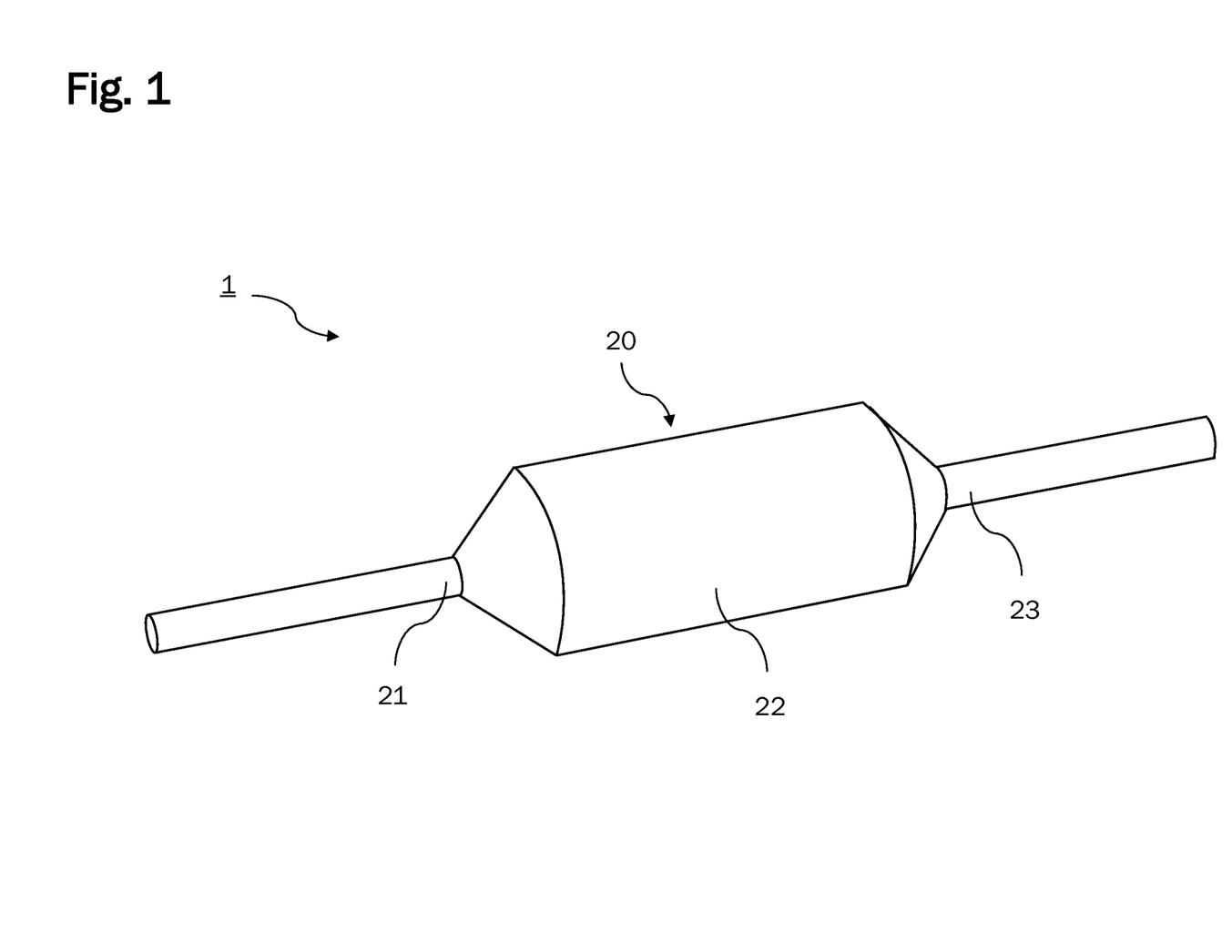
FIG. 1 is an exemplary view of a fluidic filter according to an embodiment of the disclosure.

FIG. 1 is an exemplary view of a fluidic filter according to an embodiment of the disclosure. The fluidic filter 1 comprises a filter housing 20 and a filter element 10 (not shown in FIG. 1). The filter housing 20 has an elongated shape and comprises an elongated housing part 22 which houses the filter element 10. In embodiments, the housing part 22 has a substantially cylindrical part, with the cylinder axis extending along the longitudinal direction of the filter housing 20. Alternatively, the housing part 22 may have elliptical cross section, or any other shape suitable for housing the filter element 10. On one end in the longitudinal direction of the housing part 22, an inlet part 21 is provided, and on the other end of the housing part 22 in the longitudinal direction, an outlet part 23 is provided. The inlet and outlet parts 21, 23 may relate to sections of pipe that are fixed to the housing part 22 or integrally (monolithically, that is, as a unit) formed with the housing part 22. The housing part 22 in the exemplary embodiment of FIG. 1 has a substantially cylindrical part and tapers on its longitudinal ends towards the inlet part 21 and the outlet part 23, respectively, so that respective funnel-shaped sections are formed at respective transitions of the housing part to the inlet part 21 and the outlet part 23. The filter housing 20 may be formed from a metal, preferably a corrosion-resistant metal, such as a titanium alloy. Alternatively, the filter housing 20 may be formed from ceramics or plastics. In particular, the filter housing 20 (as well as the filter element 10) may be formed from titanium 6A14V which is particularly suitable for aerospace fluidic applications. Further, the filter housing 20 is formed as a unit, i.e., monolithically. This may be achieved by additive manufacturing, for example as described in Wohlers Report 2013—Additive Manufacturing and 3D Printing State of the Industry Annual Worldwide Progress Report, Wohlers Associates Inc., 2013.

Figure 2:
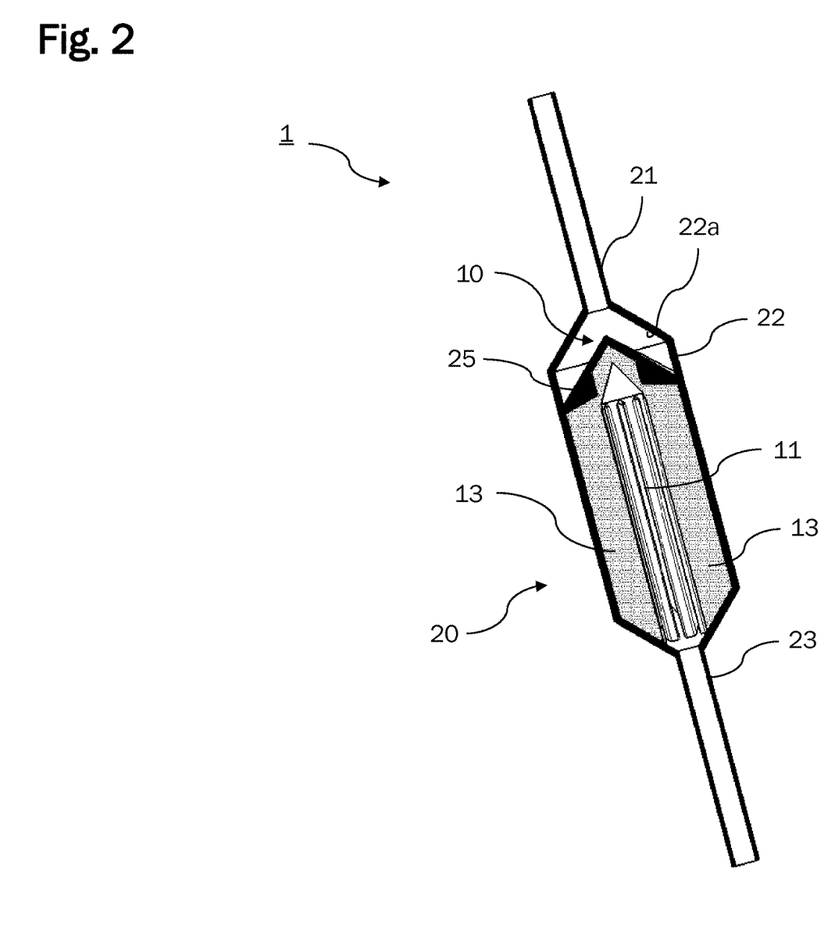
FIG. 2 is a schematic exemplary view of a longitudinal cut through the fluidic filter.
Figure 3:
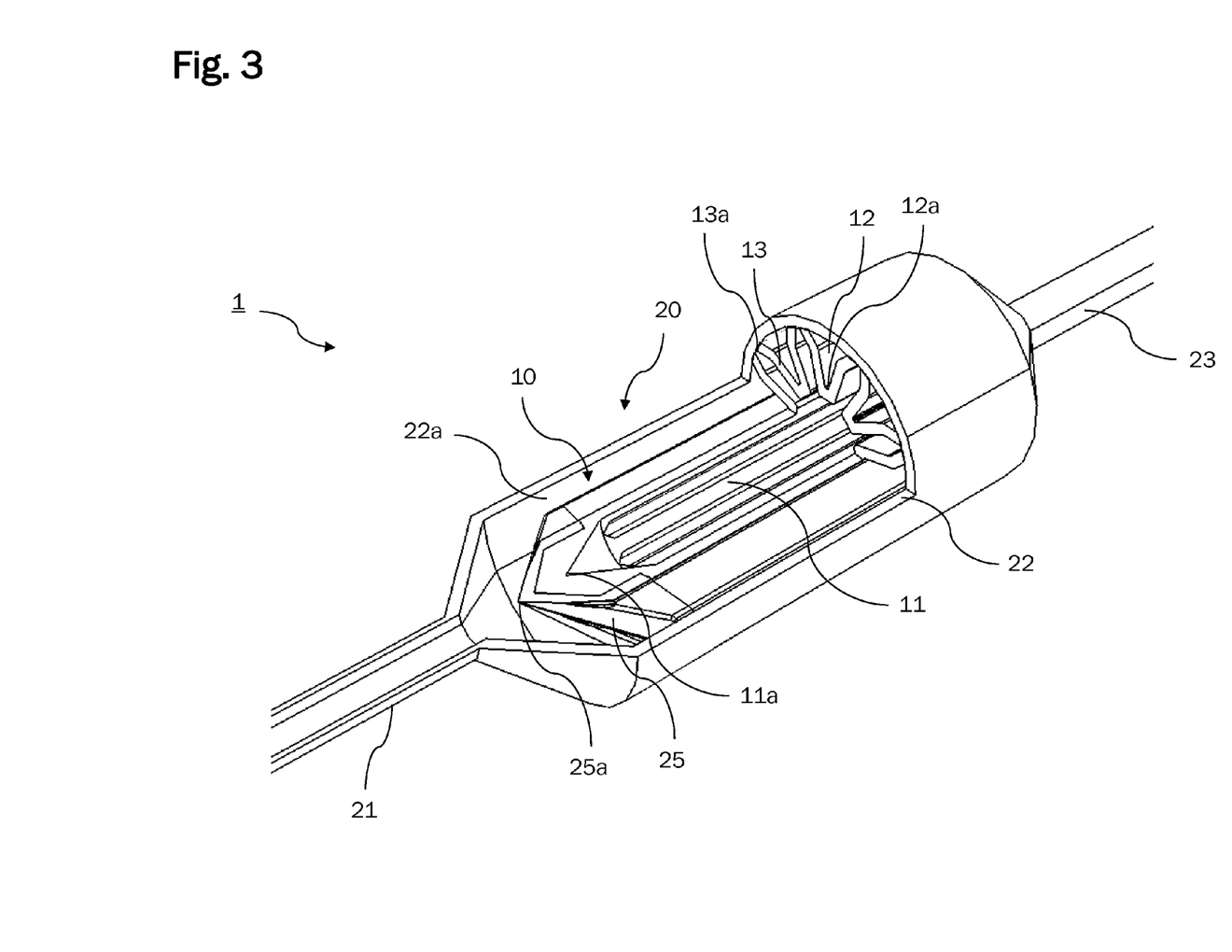
FIG. 3 is an exemplary perspective view of the fluidic filter that has been mechanically cut for purposes of illustration.
Figure 4:
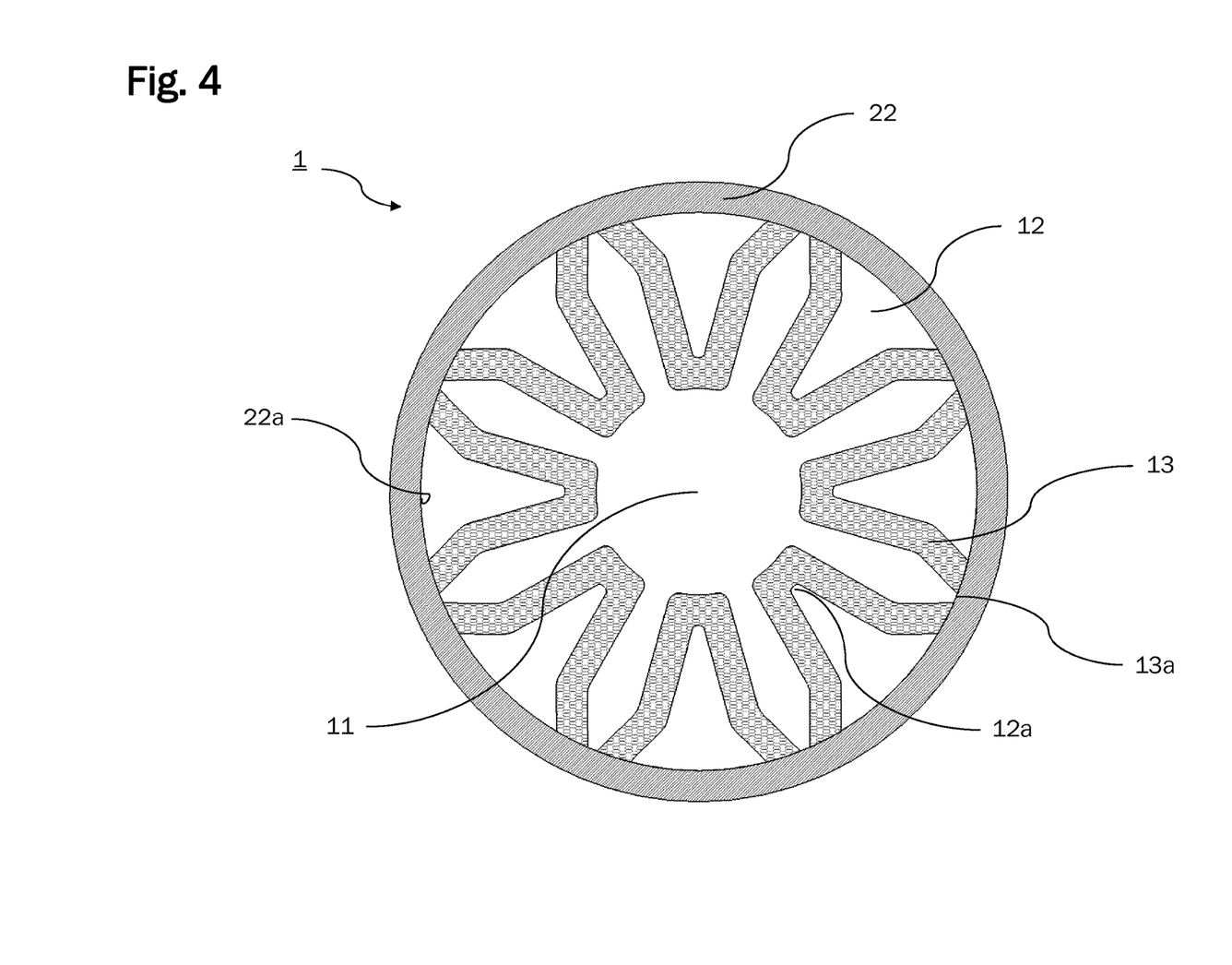
FIG. 4 is a schematic exemplary view of a transverse cut through the fluidic filter.
Figure 5:
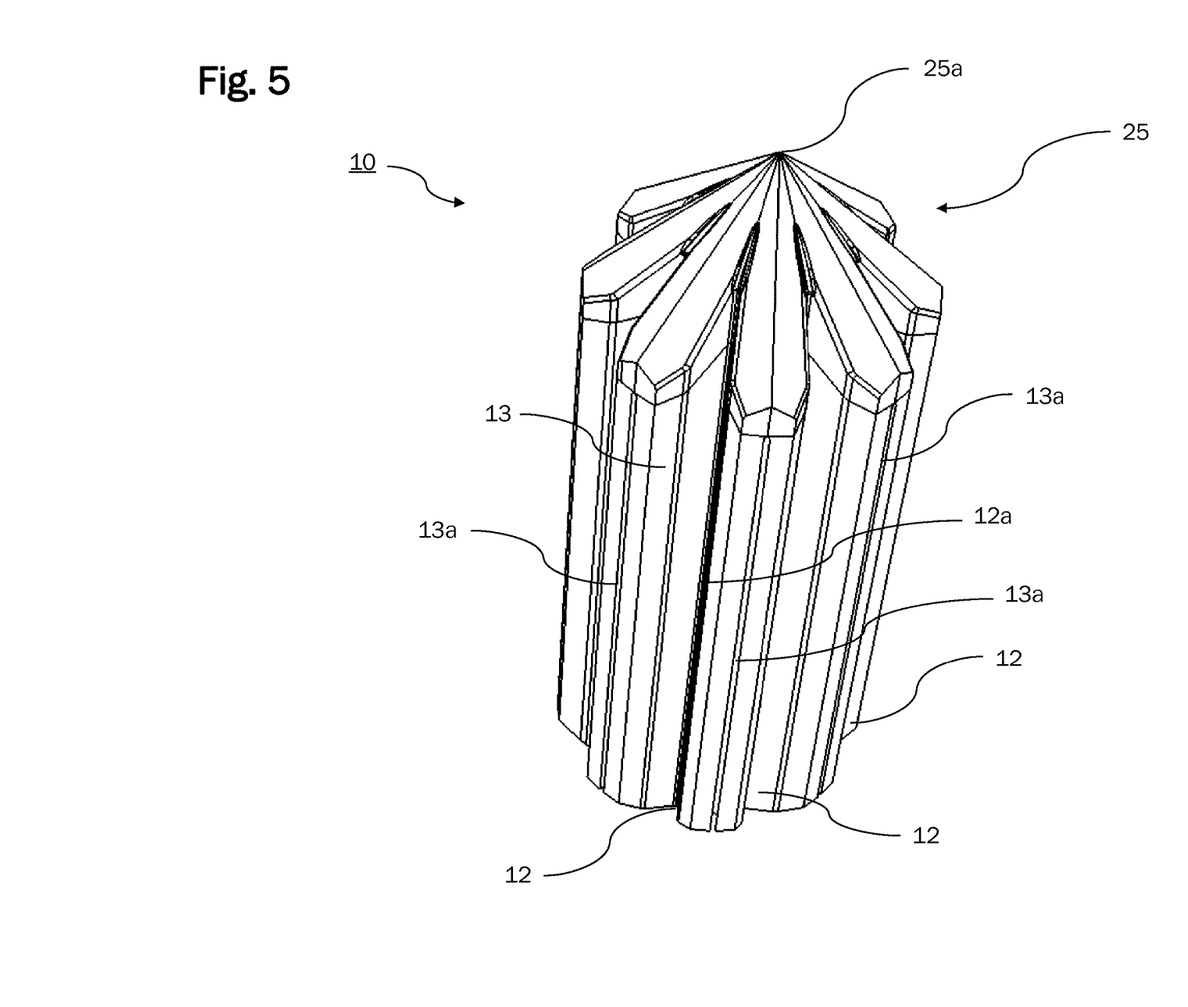
FIG. 5 is a schematic exemplary perspective view of a filter element of the fluidic filter.

FIG. 2 is a schematic exemplary view of a longitudinal cut through the fluidic filter. FIG. 3 exemplarily illustrates a perspective view of the fluidic filter in a state in which it has been physically cut open for illustrative purposes. FIG. 4 is a schematic exemplary view of a transverse cut through the fluidic filter, and FIG. 5 is a schematic exemplary perspective view of a filter element 10 of the fluidic filter.

As can be seen from FIG. 2, the filter element 10 is housed inside the housing part 22 of the filter housing 20. The filter element 10 has a longitudinal shape and is arranged to extend along the longitudinal direction of the filter housing 20. In embodiments, the filter element 10 has an N-fold symmetry with respect to rotation about its center axis extending in the longitudinal direction. The filter element 10 has an inlet side that is arranged so as to face the inlet part 21 of the filter housing 20 and an outlet side that is arranged so as to face the outlet part 23 of the filter housing 20. During operation of the fluidic filter 1, the fluid to be filtered enters the housing part 22 of the filter housing 20 through the inlet part 21, is filtered by the filter element 10, and exits the housing part 22 through the outlet part 23.

Inside the filter element 10, a longitudinal hollow (first flow passage) 11 is formed that is connected to the outlet part 23 of the filter housing 20. In other words, the filter element 10 has an opening on its outlet side so that a fluid may pass from the first flow passage 11 through the opening towards or into the outlet part 23.

On its other end in the longitudinal direction, i.e., on the inlet side of the filter element 10, the first flow passage 11 is closed. The first flow passage 11 may taper towards its closed end to have an apex point 11a at its closed end. Further on the inlet side of the filter element 10, a tip portion (inlet side end portion) 25 is formed which has a cone-like shape. The inlet side end portion 25 has a lateral surface extending from an apex 25a of the inlet side end portion 25 to a (virtual) base of the inlet side end portion 25. Therein, the apex 25a is located on the center axis of the filter element 10, and the (virtual) base extends in perpendicular to the center axis. The lateral surface has an angle of inclination between 45° (degrees) and 60° with respect to a plane extending in perpendicular to the longitudinal direction of the filter element 10. In other words, any straight line on the surface of the inlet side end portion 25 extending from the apex 25a towards the (virtual) base has an angle of inclination with respect to said plane of 45° or more and 60° or less. Choosing such an angle of inclination enables the inventive fluidic filter 1 to be manufactured by additive manufacturing in a particularly simple and reliable manner. On the other hand, said choice of the angle of inclination of the cone-like inlet side end portion 25 allows for very good diversion of the fluid entering the housing part 22 of the filter housing through the inlet part 21 to the second flow passages 12.

The filter housing 20 and the filter element 10 are formed as a unit (i.e., monolithically or integrally) from the same material. In the exemplary embodiment, the filter housing 20 and the filter element 10 are formed from a corrosion-resistant metal, such as a titanium alloy, e.g., titanium 6A14V. Alternatively, the filter housing 20 and the filter element 10 may be formed from ceramics or plastics. Further in the exemplary embodiment, the filter housing 20 and the filter element 10 are formed as a unit by means of additive manufacturing. It is noted that the configuration of the inventive fluidic filter 1 has been particularly adapted to being manufacturable by additive manufacturing, wherever possible without affecting the filter properties of the fluidic filter 1. Since the filter housing 20 and the filter element 10 are formed as a unit from the same material, coefficients of thermal expansion (CTE) mismatch does not occur, and dislocation or relative movement of components is avoided. Further, it is not required to join components by welding, and common problems relating to welding do not occur, such as undercut, misalignment, and degradation of material properties (e.g., corrosion resistance, embrittlement) in the heat-affected zone.

As can be seen from FIGS. 3, 4, and 5, the filter element 10 has a plurality of ridges (lobes) 13 that extend along the longitudinal direction of the filter element 10 and protrude from the filter element 10 in a direction (protruding direction) that is oriented transversely, in particular perpendicularly, to the longitudinal direction of the filter element 10. Accordingly, the fluidic filter 1 can be said to have a multi-lobe cross section. In the longitudinal direction, the ridges 13 extend from a point at which the filter element 10 is joined to the housing part 22 of the filter housing 20 on the outlet side of the filter element 10 up to a position within the inlet side end portion 25 on the inlet side of the filter element 10. That is, the inlet side end portion 25 has a first part with a cross-section substantially of a convex polyhedron in a plane perpendicular to the longitudinal direction and a second part with a cross section featuring the ridges 13 protruding in the protruding direction (multi-lobe cross section). In other words, the plurality of ridges extend into the inlet side end portion 25 of the filter element 10. For the particular case of a cylindrical housing part 22, the first part has a cross-section of substantially a convex regular polyhedron.

Between the ridges 13, channels (second flow passages) 12 are respectively formed that extend along the longitudinal direction of the filter element 10. In the protruding direction, the second flow passages 12 are bounded by an inner surface 22a of the housing part 22.

If the filter element 10 has N ridges 13, it has an N-fold symmetry with respect to rotations about its longitudinal axis (its center axis extending along the longitudinal direction), i.e., its cross section is invariant under rotations by 360°/N about its longitudinal axis. Needless to say, for N ridges 13, the filter element 10 has N second flow passages 12. Preferably, the filter element 10 has three or more ridges 13, and in particular five or more ridges 13.

The depth of the second flow passages 12 in the protruding direction, from a point closest to a center line of the filter element 10 (i.e., from a trough 12a of the respective second flow passage 12) up to the inner surface 22a of the housing part 22, is between 0.4 to 0.8 of a distance, in the protruding direction, from the center line of the filter element 10 to a tip portion 13a of a ridge 13 adjacent to the respective second flow passage 12. Incidentally, the diameter of the filter element 10 (corresponding to twice the above distance) coincides with the inner diameter of the housing part 22 of the filter housing 20. For a non-cylindrical filter, this statement holds true for the diameter and inner diameter, respectively, at the azimuthal position in question.

Providing the plurality of ridges 13 and flow passages 12, respectively formed between the ridges 13, a filter surface area of the filter element 10 can be increased without increasing the overall dimensions of the filter element 10 and the filter housing 20. Clearly, if a depth of the second flow passages 12 is increased, a diameter of the first flow passage 11 is reduced and vice versa. The particular depth of the second flow passages 12 has been found by the present inventors to represent a value that allows to reduce a pressure drop of the fluidic filter 1 to a high degree, wherein the pressure drop depends, among others, on the filter surface area of the filter element 10, on a cross section of the first flow passage 11, and on the cross sections of the second flow passages 12.

At their tip portions 13a, the ridges 13 are joined to the inner surface 22a of the housing part 22, wherein the tip portion 13a of a respective ridge 13 represents the outermost part of the ridge 13 in the protruding direction. In the exemplary embodiment illustrated in FIGS. 1 to 5, the protruding direction corresponds to the radial direction of the filter element 10. Since the filter element 10 and the filter housing 20 are formed as a unit by additive manufacturing, said joining of the tip portions 13 to the inner surface 22a of the housing part 22 can be achieved at the time of formation, without welding. Accordingly, problems typical with the welding processes (e.g., undercut, misalignment) are avoided in the context of the present disclosure. On the other hand, joining the tip portions 13a of the ridges 13 to the inner surface 22a of the housing part 22 ensures mechanical stability of the fluidic filter 1. The resulting fluidic filter 1 is rigid under the expected fluidic loads, i.e., no elastic deformation of the fluidic filter 1 occurs under the expected fluidic loads, and the geometry of the fluid flow path is maintained at all times during normal operation.

At least a portion of the plurality of ridges 13 that faces the respective flow passage 12 is permeable to the fluid to be filtered. Accordingly, the fluid which enters the housing part 22 through the inlet part 21 is diverted by the inlet side end portion 25 to the second flow passages 12, flows along the second flow passages 12 in the longitudinal direction, and may pass through the permeable portion of the ridges 13 to the first flow passage 11, i.e., from the outside of the filter element 10 to its inside. From there, the fluid may flow along the first flow passage 11 in the longitudinal direction and may exit the housing part 22 through the outlet part 23. Therein, the permeable portion is formed so as to have a given filter rating in accordance with the intended field of application of the fluidic filter.

The cross section of each ridge 13 in the plane perpendicular to the longitudinal direction of the filter element 10 in the exemplary embodiment may have the following shape. Namely, the cross section of each ridge 13 comprises a first part arranged towards the center line of the filter element 10 and a second part arranged towards a periphery of the filter element 10 in the protruding direction. The first part of the cross section is shaped so that a width of the first part in a direction (width direction) perpendicular to the protruding direction and perpendicular to the longitudinal direction increases along the protruding direction. The second part of the cross section is arranged adjacent to the first part so that a width of the first part and the width of the second part in the width direction at the transition from the first part to the second part are equal. The second part is further shaped so that the width of the second part decreases along the protruding direction. The outermost part in the protruding direction of the cross section, which corresponds to the tip portion 13a of the ridge, may either be an apex point or an end portion that has a given width in the width direction. FIG. 5, for example, illustrates a case in which the end portion has a certain width in the width direction. The end portion is joined to the inner surface 22a of the housing part 22. Alternatively, the first part of the cross section may be shaped so that the width of the first part in the width direction is substantially constant along the protruding direction.

In the exemplary embodiment, for a substantially cylindrical housing part 22, the filter element 10 is formed so that respective innermost parts of the second flow passages 12 in the protruding direction (bottom portions, or troughs 12a) are arranged on a circular line (or rather, cylinder) and outermost parts (tip portions 13a) of the ridges 13 are arranged on another circular line (or rather, cylinder). Further, the ridges 13 are formed identically so that the filter element 10 has an N-fold symmetry with respect to rotations about the longitudinal axis of the filter element 10 if there are N ridges 13, as explained above. In the example of FIGS. 4 and 5, N=8 ridges 13 are provided. However, any other number of ridges may be provided, as long as the number is equal to or larger than 3. Alternatively, the filter element 10 may have a configuration in which different types of ridges are provided, for instance in which smaller ridges are provided between larger ridges to extend into the second flow passages formed respectively between the larger ridges. Also, the cross-sectional shape of the filter element 10 is not necessarily limited to substantially circular, that is, the innermost portions of the second flow passages 12 and the outermost parts of the ridges 13 do not necessarily need to lie on respective circular lines, but also other line shapes, such as ellipses, for example, are possible.

The permeable portion of the plurality of ridges 13 referred to above may comprise a mesh of interconnected elongated elements (elongated mesh-forming elements, e.g., struts, strands, threads, or wires). The interconnected struts (exemplarily embodying elongated mesh-forming elements) are joined to each other to form the respective layer of mesh. The orifices (openings) of the mesh that are formed between the struts are of a shape that is not limited to square or rectangular. For instance, said orifices may have the shape of polyhedrons, such as hexagons. Preferably, the interconnected struts of a layer of mesh are formed monolithically, that is, as a unit. The ridges 13 may comprise multiple parallel layers of interconnected struts, wherein the multiple layers are arranged relative to each other in a parallel relationship. That is, the ridges 13 are formed from a mesh of interconnected struts and, in particular, from multiple layers of mesh of interconnected struts that are arranged in a parallel relationship. Adjacent layers of mesh may be displaced from each other in a direction perpendicular to the layers, and joined by struts (inter-layer struts, exemplarily embodying elongated inter-layer mesh-forming elements) extending in a direction intersecting the layers (i.e., in a direction not parallel to the layers, e.g., said direction perpendicular to the layers). Thereby, a three-dimensional mesh of interconnected struts is formed. Preferably, the interconnected struts of adjacent layers of mesh and the inter-layer struts are formed monolithically, that is, as a unit. In other words, the three-dimensional mesh is formed monolithically, that is, as a unit.

In the above configuration, the effective size of passages through the parallel layers of the mesh depends on the size (area) of the orifices in each layer, on the displacement of adjacent layers in the direction perpendicular to the layers, and on a distance between the inter-layer struts, which are each chosen accordingly.

Alternatively, adjacent layers of mesh may be arranged so as to come into contact with each other, and struts of the adjacent layers of mesh may be joined to each other at respective points of contact of the struts of the adjacent layers. Also here, the adjacent layers are preferably formed monolithically, that is, as a unit.

Since the mesh is formed by layers of interconnected struts (exemplarily embodying elongated elements) that are connected at respective points of contact, problems that are present in conventional meshes formed by layers of crossing strands are avoided. For instance, in a layer of crossing strands, strands have to be bent over/under the respective crossing strands, which limits flexibility in designing the mesh, and moreover may lead to material fatigue at the points at which the strands are bent over/under respective crossing strands.

Figure 6:
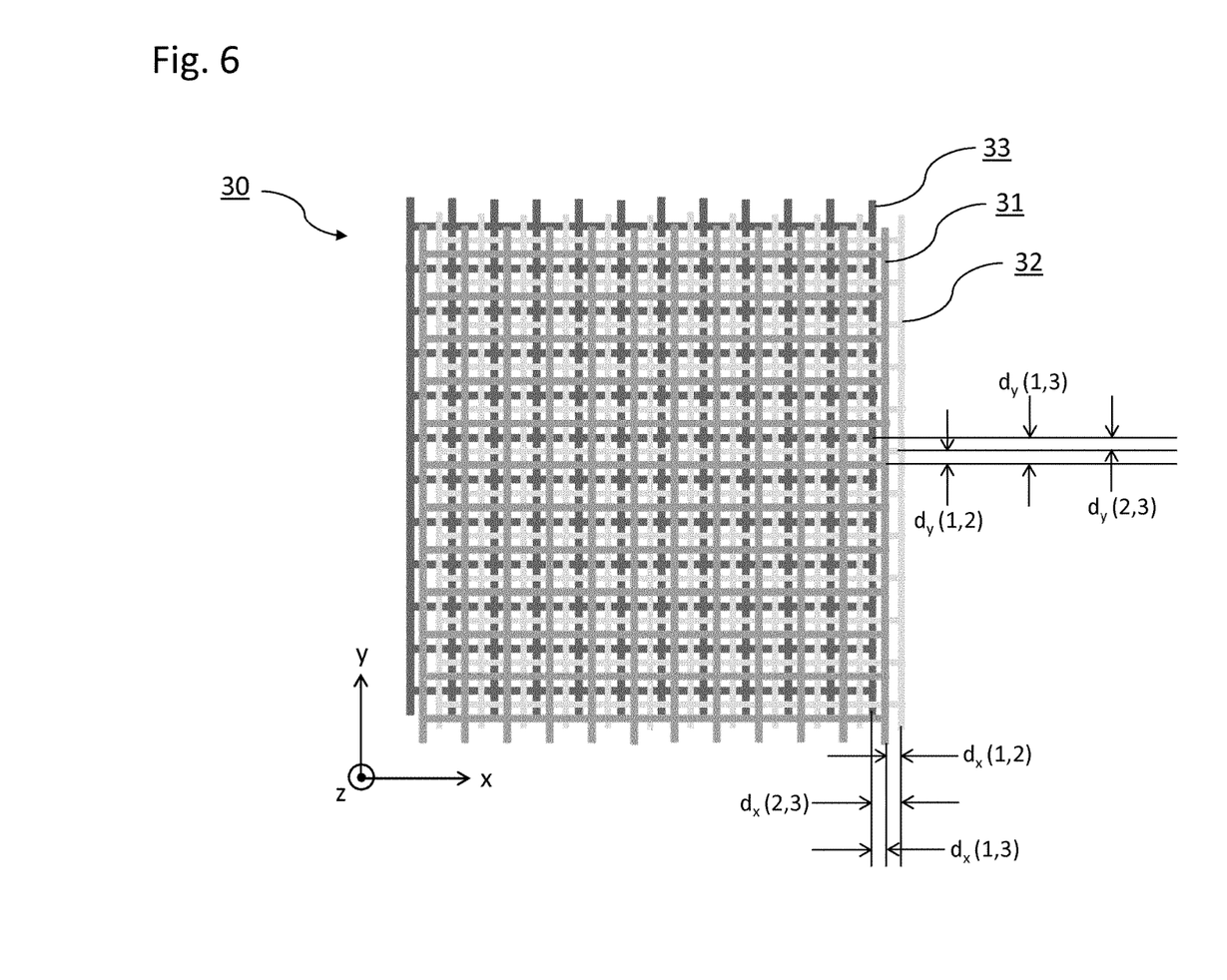
FIG. 6 exemplarily illustrates multiple layers of mesh as comprised by the filter element.

FIG. 6 illustrates a simple example for such multiple layers of mesh of interconnected struts. In this figure, reference numeral 31 indicates a first layer, reference numeral 32 indicates a second layer extending in parallel to the first layer 31, and reference numeral 33 indicates a third layer extending in parallel to the first layer 31 and the second layer 32. While FIG. 6 illustrates three layers of mesh, any other number of layers is of course possible and in fact, larger numbers of layers of mesh result in a better (lower) filter rating. It is understood that the following statements that are made for the exemplary case of three layers may be readily generalized to any other number of layers.

Within each of the first to third layers 31, 32, 33, the interconnected struts are joined to each other at respective points of contact. Further, adjacent layers of mesh are preferably displaced from each other in a direction perpendicular to the layers, and may be joined by struts extending in a direction intersection the layers (inter-layer struts; not shown in FIG. 6). Alternatively, the adjacent layers of mesh may be arranged so as to come into contact with each other, and struts of the adjacent layers of mesh may be joined to each other at respective points of contact of the struts of the adjacent layers. Since the struts within each layer are interconnected and joined to each other at respective points of contact and adjacent layers of mesh are joined to each other, movement of the struts relative to each other is prevented. Accordingly, a spreading of orifices (openings) formed between the struts (i.e., a widening or opening of the mesh) and a degradation of the filter rating during the lifetime of the fluidic filter are prevented. Moreover, said joining of struts results in a mechanically stable and rigid filter element 10. Mechanical stability of the filter element 10 is further increased by joining the tip portions 13a of the ridges 13 to the inner surface 22a of the housing part 22, as indicated above.

As can be further seen from FIG. 6, the multiple layers of mesh of interconnected struts are displaced (shifted) with respect to each other in a direction that extends in parallel to the planes in which the multiple layers of mesh respectively extend. In the example of FIG. 6, struts of the respective layers of mesh extend in the x- and y-directions, respectively, and the multiple layers of mesh are stacked in a parallel relationship on top of each other in the z-direction. In the example, the second layer 32 is displaced with respect to the first layer 31 by a displacement amount $dx(1,2)$ in the x-direction and by a displacement amount $dy(1,2)$ in the y-direction. The third layer 33 is displaced with respect to the second layer 32 by a displacement amount $dx(2,3)$ in the x-direction and by a displacement amount $dy(2,3)$ in the y-direction. Therein, the displacement between the first and second layers 31, 32 and the second and third layers 32, 33 is preferably chosen so that the third layer 33 is displaced with respect to the first layer by a displacement amount $dx(1,3)$ in the x-direction and a displacement amount $dy(1,3)$ in the y-direction, wherein both displacement amounts $dx(1,3)$ and $dy(1,3)$ are non-vanishing. In the example of FIG. 6, the spacing between struts in both directions within each layer is identical, i.e., quadratic orifices are formed between adjacent struts. Further in the example, the spacing between struts is the same for all layers. In such a case, it is understood that the respective displacements $dx(i,j)$ and $dy(i,j)$ are not integral multiples of the spacing between the struts.

In general, the mesh comprises M layers of mesh, each layer having at least a plurality of struts extending in a first direction and a plurality of struts extending in a second direction distinct from the first direction. In general, the first and second directions do not need to be orthogonal to each other, although this is the case in the example of FIG. 6. The M layers of the mesh are arranged extending in parallel to each other. Each layer of mesh is displaced (shifted) with respect to its neighboring layers of mesh in a third direction that is distinct from preferably both of the first direction and the second direction and extends in the plane spanned by the first and second directions. In other words, the third direction has a non-vanishing component in the first direction (first component) and a non-vanishing component in the second direction (second component). Alternatively, the struts of each layer may be arranged so that extending directions (first and second directions) of the struts of adjacent layers of mesh do not coincide, i.e., adjacent layers may be rotated with respect to each other about an axis extending in the stacking direction.

Displacement, i.e., the displacement amount (shift amount) between layers is chosen so that, numbering the layers in a stacking direction perpendicular to the first direction and the second direction from one to M, the m-th layer does not coincide with any of the (m+$\Delta$m)-th layers when seen in the stacking direction, wherein $\Delta$m preferably is chosen larger than or equal to 2. In other words, the displacement amount between the layers is chosen so that the m-th layer (i.e., the orifices of the m-th layer) is not in registration with any of the (m+1)-th, . . . , (m+$\Delta$m)-th layers when seen in the direction perpendicular to the layers.

As indicated above, the displacement amount between adjacent layers of mesh is chosen such that the orifices of the adjacent layers of mesh are not in registration (in the perpendicular direction) after the displacement. However, the adjacent layers of mesh may also be shaped differently from each other and have differently shaped orifices. Thus, in more general terms, it can be said that adjacent layers of mesh are arranged so that orifices formed in said adjacent layers of mesh are not in registration with each other when seen in the direction perpendicular to the layers of mesh.

Providing a mesh having a plurality of layers of mesh of interconnected struts as described above due to the displacement enables the filter to reach a filter rating that would not be attainable with a single layer of mesh. Clearly, the attainable filter rating becomes better with increasing numbers of layers of mesh that are arranged in a parallel relationship with each other, provided that the displacement of layers of mesh with respect to each other is chosen appropriately, as described above. Also, providing a plurality of layers of mesh prevents long slender contaminants, such as filaments, from passing through the mesh. On the other hand, an increasing number of layers of mesh implies an increasing thickness of the mesh, so that the number of layers is constrained by the overall shape and size of the filter element 10.

The inlet side end portion 25 has a surface that is not permeable to the fluid, as can be seen e.g., from FIG. 2. In other words, the mesh of interconnected elongated elements is formed in a periphery of the filter element 10 in the protruding direction, but not in a periphery of the filter element 10 in the longitudinal direction towards the inlet side. Providing a non-permeable inlet side end portion 25 improves the diversion of the flow of the fluid entering the housing part 22 from the inlet part 21 to the plurality of second flow passages 12. Further, the inlet side end portion 25 according to this embodiment contributes to preventing particle build-up and clogging at the head (i.e., the inlet side, or upstream side) of the filter element 10.

A further embodiment of the disclosure relates to a section of pipe comprising an inlet part, an outlet part, an intermediate part, wherein the intermediate part has a larger diameter than each of the inlet part and the outlet part and forms a leak-tight unit with the inlet part and the outlet part, and a filter element comprising a mesh part having plural interconnected elongated elements, wherein the filter element is arranged inside the intermediate part, wherein the inlet part, the outlet part, the intermediate part and the filter element are formed as a unit by additive manufacturing. Therein, the inlet part and outlet part corresponds to the inlet part 21 and outlet part 23, respectively, of the fluidic filter 1 described above. The intermediate part corresponds to the housing part 22 of the fluidic filter 1, the filter element corresponds to the filter element 10 of the fluidic filter 1, and the mesh part corresponds to the permeable portion of the plurality of ridges 13 of the filter element 10 of the fluidic filter 1. It is understood that the explanations made above for the fluidic filter 1 likewise apply to the section of pipe to this embodiment.

Features, components and specific details of the structures of the above-described embodiments may be exchanged or combined to form further embodiments optimized for the respective application. As far as those modifications are readily apparent for an expert skilled in the art, they shall be disclosed implicitly by the above description without specifying explicitly every possible combination, for the sake of conciseness of the present description.

The invention claimed is:

1. A fluidic filter for filtering a fluid, comprising:
a filter housing having an inlet part, an outlet part and a housing part; and
a filter element having an inlet side and an outlet side, the filter element being housed inside the housing part of the filter housing,
wherein the filter element comprises:
a first flow passage inside the filter element that extends along a longitudinal direction of the filter element and is connected to the outlet part; and
a plurality of ridges extending along the longitudinal direction, wherein a plurality of second flow passages respectively are formed between ridges of said plurality of ridges and an inner surface of the housing part, allowing the fluid to flow from the inlet side of the filter element along the longitudinal direction,
wherein at least a portion of the plurality of ridges facing the second flow passages is permeable to the fluid so as to allow passage of the fluid from the second flow passages to the first flow passage; and
wherein a tip portion of each of the plurality of ridges is joined to the inner surface of the housing part along a part of the tip portion of the respective ridge in the longitudinal direction.

2. The fluidic filter according to claim 1, wherein a depth of the second flow passages in a protruding direction of the respective ridges is between 0.4 to 0.8 of a distance, in the protruding direction, from the center line of the filter element to the tip portion of a ridge adjacent to the respective second flow passage.

3. The fluidic filter according to claim 1, wherein the tip portion of each of the plurality of ridges is joined to the inner surface of the housing part along a full length of the respective tip portion in the longitudinal direction.

4. The fluidic filter according to claim 1, wherein said portion of the plurality of ridges comprises a mesh of interconnected elongated elements having respective points of contact.

5. The fluidic filter according to claim 4, wherein the elongated elements are joined to each other at their respective points of contact.

6. The fluidic filter according to claim 4, wherein said portion of the plurality of ridges further comprises a plurality of parallel layers of mesh.

7. The fluidic filter according to claim 6, wherein adjacent layers of mesh are displaced with respect to each other in a direction extending in a plane of the plurality of parallel layers of mesh.

8. The fluidic filter according to claim 6,
wherein adjacent layers of mesh are joined by elongated elements extending in a direction intersecting the layers of mesh.

9. The fluidic filter according to claim 1, wherein the filter element, at the inlet side thereof, comprises an inlet side end portion shaped for diverting the flow of the fluid flowing from the inlet part to the plurality of second flow passages.

10. The fluidic filter according to claim 9, wherein the plurality of ridges and the plurality of second flow passages extend into the inlet side end portion of the filter element.

11. The fluidic filter according to claim 9, wherein a surface of the inlet side end portion that faces the inlet part of the filter housing is configured to be not permeable to the fluid.

12. The fluidic filter according to claim 9, wherein a wall portion of the inlet side end portion has an angle of inclination of 45 degrees or more and 60 degrees or less with respect to a plane extending in perpendicular to the longitudinal direction of the filter element.

13. The fluidic filter according to claim 1, wherein the filter housing and the filter element are formed monolithically.

14. The fluidic filter according to claim 1, wherein the filter housing and the filter element are formed from a corrosion-resistant metal.

15. The fluidic filter according to claim 1, wherein the filter housing and the filter element are formed from a titanium alloy.

16. The fluidic filter according to claim 1, wherein the filter housing and the filter element are formed in a layer-wise manner by additive manufacturing.

17. The fluidic filter according to claim 6, wherein elongated elements of adjacent layers of mesh are joined to each other at respective points of contact of the elongated elements of the adjacent layers.

18. A method of forming a fluidic filter according to claim 1, comprising forming the filter housing and the filter element in a layer-wise manner by additive manufacturing.

19. A method of forming a fluidic filter according to claim 1, comprising forming the filter housing and the filter element monolithically.

\* \* \* \* \*